United States Patent [19]

Yamashita et al.

[11] 4,419,801

[45] Dec. 13, 1983

[54] METHOD FOR MANUFACTURING A CAST IRON CYLINDER BLOCK

[75] Inventors: Hajime Yamashita; Michio Takenaka, both of Hiroshima, Japan

[73] Assignee: Toyo Kogyo Co., Ltd., Hiroshima, Japan

[21] Appl. No.: 226,099

[22] Filed: Jan. 19, 1981

[30] Foreign Application Priority Data

Jan. 19, 1980 [JP] Japan ........................... 55-4689

[51] Int. Cl.³ ................. B23P 15/00; B23P 13/02
[52] U.S. Cl. ................... 29/156.4 WL; 29/527.6; 148/35; 123/193 C; 164/69.1
[58] Field of Search ............. 29/156.4 WL, 527.6, 29/557, DIG. 5; 123/193 C, 193 CP, 41.72; 92/169; 164/69.1, 70.1; 148/35; 51/290

[56] References Cited

U.S. PATENT DOCUMENTS

| | | | |
|---|---|---|---|
| 1,635,530 | 7/1927 | Broderick | 148/35 |
| 2,085,976 | 7/1937 | Heintz | 123/193 C |
| 2,176,773 | 10/1939 | Sparkes | 29/156.4 WL |
| 3,033,183 | 5/1962 | Erickson | 123/193 C |
| 3,476,020 | 11/1969 | Fangman | 123/193 C |
| 3,620,137 | 11/1971 | Prasse | 123/193 C |
| 4,318,214 | 3/1982 | Dodson | 29/527.6 |

FOREIGN PATENT DOCUMENTS

| | | | |
|---|---|---|---|
| 1046396 | 12/1958 | Fed. Rep. of Germany | 92/169 |
| 1562455 | 3/1977 | United Kingdom | 29/156.4 WL |

Primary Examiner—Daniel C. Crane
Attorney, Agent, or Firm—Fleit, Jacobson, Cohn & Price

[57] ABSTRACT

Method for manufacturing a cast iron cylinder block including steps of moulding the cylinder block with a cylinder wall formed with one or more protuberances in areas that will be subjected to piston side thrust forces so that the cylinder wall possesses a structure having more advanced growth of graphite in the aforementioned areas than in other areas, and thereafter removing the protuberance to form a cylinder bore. The cylinder block thus produced has a high ability of absorbing piston slap noise.

4 Claims, 11 Drawing Figures

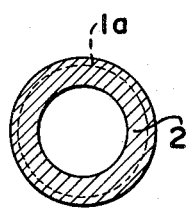
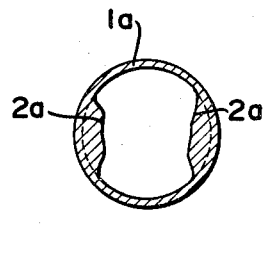
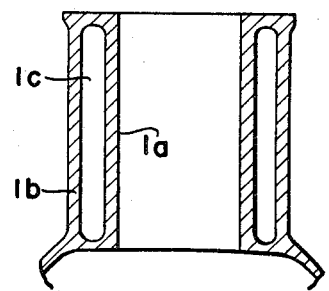
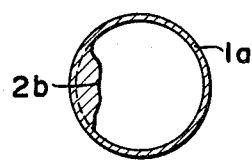
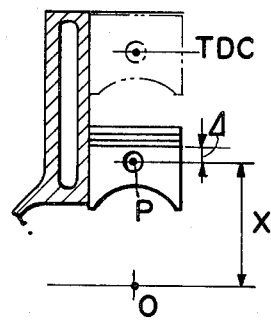
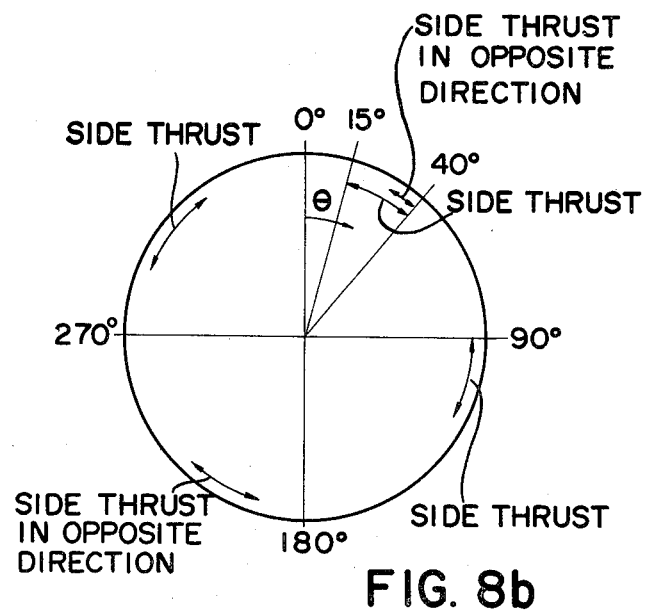

METHOD FOR MANUFACTURING A CAST IRON CYLINDER BLOCK

The present invention relates to a method for manufacturing cylinder blocks for internal combustion engines. More particularly, the present invention pertains to a method for manufacturing cast iron cylinder blocks.

In recent years, in the field of internal combustion engines, there have been icreasing requirements for decreasing engine noise. For the purpose, developments have been made on the arrangements for reducing mechanical noises which are produced in valve mechanisms. As the results, piston slap noise has become noticeable among the engine noise. The piston slap noise is produced as the piston reciprocates in the cylinder due to the side forces which are applied to the piston from the crank mechanism comprised of a crankshaft and a connecting rod. More specifically, the piston is applied with side forces which are substantially perpendicular to the axis of the crankshaft and act on the piston alternately in one and the opposite directions during one operating cycle of the crankshaft. Thus, the piston is cyclically moved sidewardly to hit the cylinder wall producing a noise which is transmitted through the cylinder wall outwardly.

The side force has a peak value when the gas pressure in the combustion chamber is in the maximum value or when the piston is at 15° to 40° C. after top dead center in terms of the crank angle. In this instance, the slap noise therefore becomes largest. Another peak value of the side force is produced in the ascending stroke of the piston after bottom dead center.

In the field of internal combustion engines, there is a standing requirement of decreasing the engine weight and efforts have been made to decrease the cylinder wall thickness. However, in cast iron cylinder blocks, a decrease in the wall thickness causes an increase in the cooling rate so that a problem has been encountered in that the cylinder wall has a structure wherein graphites are not sufficiently grown. In fact, the cylinder wall has a high percentages of D or E type structure in ASTM (American Society for Testing Materials) standard which has a relatively low vibration absorbing property. Thus, the piston slap noise is transmitted through the cylinder wall producing an audible engine noise.

It is therefore an object of the present invention to provide a method for manufacturing an engine cylinder block in which the engine slap noise can be decreased. Another object of the present invention is to provide a method for manufacturing an engine cylinder block which has a high ability of absorbing vibrations so that a transmittal of the piston slap noise can be noticeably decreased.

According to the present invention, the above and other objects can be accomplished by a method for manufacturing a cast iron cylinder block for an internal combustion engine, said method comprising steps of casting a cylinder block with a cylinder wall formed with at least one protuberance in an area that will be subjected to a piston side thrust force so that the cylinder wall possesses a structure having more advanced growth of graphite in said area than in other areas, and removing the protuberance to form a cylinder bore. In one aspect of the present invention, the protuberance is formed in an area that will be subjected to a peak piston side thrust force during a descending stroke of the piston. Usually, such peak side thrust force is produced at 15° to 40° after top dead center in terms of crank angle. Preferably, a second protuberancy is formed in a second area at diametrically opposite side to the first mentioned area. In another feature of the present invention, the protuberance may be of an annular configuration formed circumferentially along the cylinder wall. Alternatively, a pair of protuberancies may be provided in axially spaced positions. It is preferred that in the first mentioned area the cylinder wall has an A or C type structure in accordance with the ASTM standard.

The above and other objects and features of the present invention will become apparent from the following descriptions of preferred embodiments taking reference to the accompanying drawings, in which:

FIG. 4 is a fragmentary sectional view taken along the line IV—IV in FIG. 3;

FIGS. 5 and 6 are sectional views similar to FIG. 4 but showing other embodiments;

FIG. 7 is a vertical sectional view of the cylinder bock in which protuberancies are removed to provide a cylinder bore;

Figure 9:
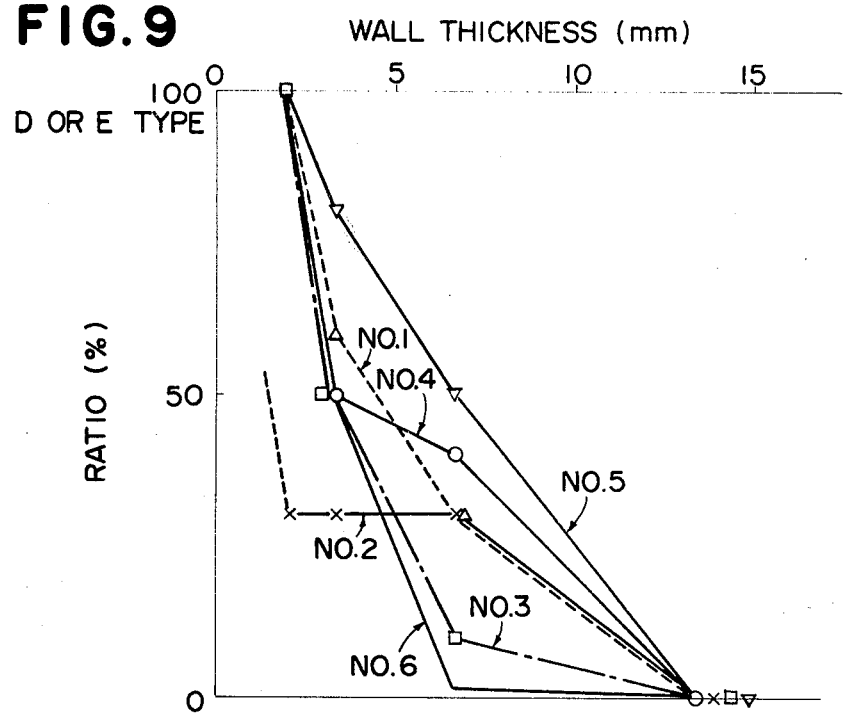
Figure 10:
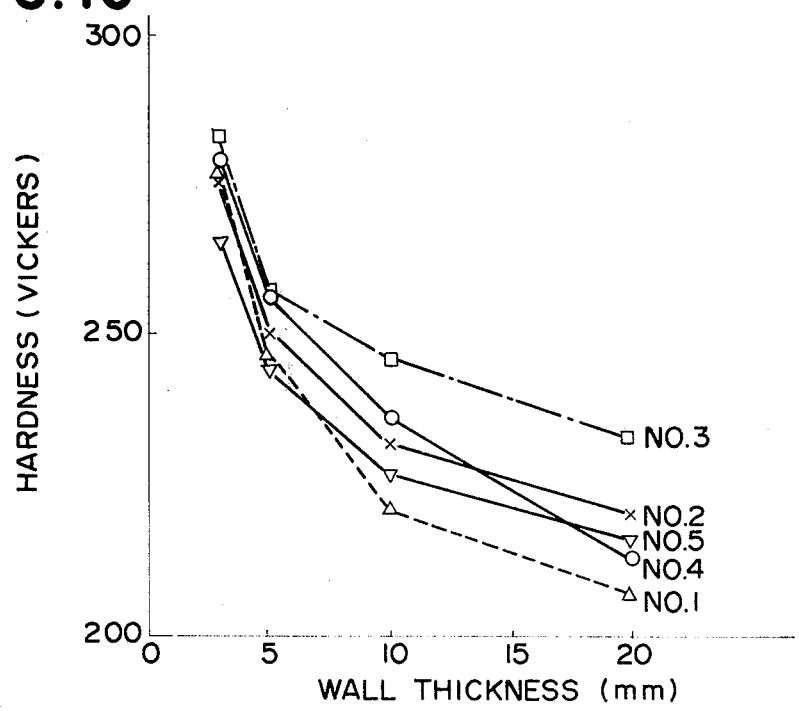

FIGS. 8 (a) and (b) show the areas wherein the protuberancies shall be formed;

FIG. 9 is a diagram showing the relationship between the cylinder wall thickness and the growth of graphite; and, FIG. 10 is a diagram showing the relationship between the cylinder wall thickness and the hardness.

Figure 1:
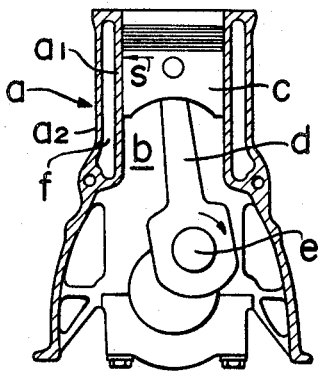
FIG. 1 is a fragmentary sectional view of an internal combustion engine having a cylinder block to which the present invention can be applied.
Figure 2:
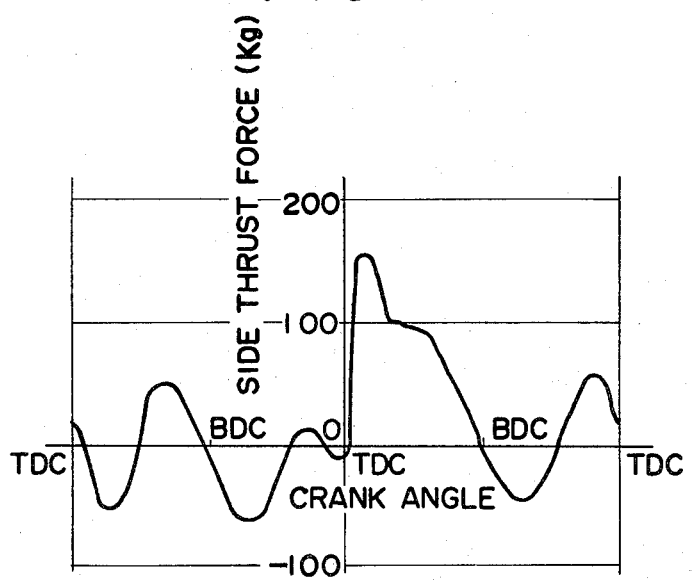
FIG. 2 is a diagram showing the change in the piston side thrust force in one complete cycle of a four stroke engine.

Referring now to the drawings, particularly to FIG. 1, the engine shown therein includes a cylinder block a having a cylinder bore b in which a piston c is slidably received. The piston c is connected through a connecting rod d with a crankshaft e. The cylinder block a includes a cylinder wall $a_1$ and an outer wall $a_2$ to define cooling water jackets f. As the piston c reciprocates in the cylinder bore b, the crankshaft e rotates in the direction shown by an arrow in FIG. 1 and a side thrust force s is applied from the piston c to the cylinder wall $a_1$. In case of a four stroke engine, the side thrust force s changes as shown in FIG. 2. A peak value of the side thrust force s is produced in the combustion stroke at 15° to 40° after top dead center in terms of the crank angle. In FIG. 2, it will further be noted that a side thrust force is applied in the opposite direction in the exhaust, suction and compression strokes. These side thrust forces cause the piston hit to the cylinder wall to produce piston slap noises.

Figure 3:
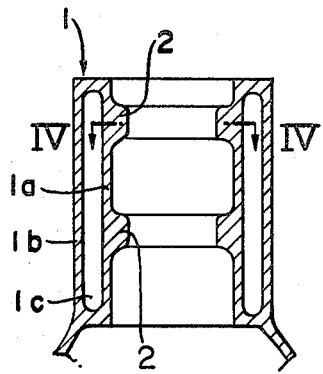
FIG. 3 is a vertical sectional view of a cylinder block in accordance with one embodiment of the present invention.

Referring now to FIGS. 3 and 4, there is shown a first step of the method in accordance with one embodiment of the present invention. In this step, a cylinder block blank 1 is moulded by cast iron with a cylinder wall 1a, an outer wall 1b and cooling water jackets 1c therebetween. The cylinder wall 1a is integrally formed with a pair of protuberancies 2 which are spaced apart from each other in the axial direction of the cylinder. In the illustrated embodiment, the protuberancies 2 are of annular configurations as shown in FIG. 2. Alternatively, the protuberancies 2a may be formed at diametrically oposite positions wherein the cylinder wall 1a is subjected to the side thrust forces as shown in FIG. 5, or only one protuberance 2b may be formed at an area wherein the cylinder wall 1a is subjected to the side thrust force of the peak value.

The blank 1 of the cylinder block is then subjected to a second step wherein the protuberancies 2 are removed and the cylinder wall 1a if finished to provide a cylinder bore. The protuberancies 2 provides an increased wall thickness so that the cooling rate of the moulded material is decreased in the areas wherein the protuberancies 2 are formed than in other areas. As the result, in the areas having the protuberancies 2, the growth of graphite is more advanced than in other areas and there is provided a structure substantially of A or C type in respect of the graphite phase in accordance with the ASTM standard. This structure has a relatively low hardness and a relatively low coefficient of elasticity so that it has a relatively high ability of absorbing vibration energy.

Referring to FIG. 9, there is shown the relationship between the graphite growth and the cylinder wall thickness. The graphite growth is shown in terms of the ratio of the D or E type graphite phase, among total graphite structure. It will be understood that, as the cylinder wall thickness is increased, the A or C type graphite phase is correspondingly increased and only the A or C type graphite phase is substantially produced with the wall thickness greater than 10 mm. FIG. 10 shows the relationship between the hardness and the wall thickness. It will be seen that the hardness decreased in response to an increase in the wall thickness.

It will therefore be understood that the cylinder block shown in FIG. 7 has a thin cylinder wall 1a but it has cast iron structures including highly grown graphites in areas wherein the cylinder wall is subjected to piston side thrust forces. Thus, the piston slap noises which may be produced as the piston hits the cylinder wall under the side thrust forces will be substantially absorbed by the cylinder wall so that the possibility of transmittal of the slap noises can significantly be decreased. Further, such cast iron structures having highly grown graphite are produced by locally provided protuberancies so that the loss of material can be kept minimum.

For the purpose of the present invention, only one protuberance 2 may be provided at the area wherein the cylinder wall is subjected to the side thrust force of the peak value which is produced in the combustion stroke of the engine. However, one or more additional protuberancies may be formed in those areas of the cylinder wall which is subjected to further piston side thrust forces. Referring to FIG. 8(a), there are shown piston phases wherein the piston side forces are produced. The axial positions of the piston are then calculated to determine the proper positions of the protuberancies so that the protuberancies be provided only where necessary.

The invention has thus shown and described with reference to specific embodiments, however, it should be noted that the invention is in no way limited to the details of the illustrated configurations but changes and modifications may be made without departing from the scope of the appended claims.

We claim:

1. Method for manufacturing a cast iron cylinder block for an internal combustion engine, in which piston slap noise can be decreased, said method comprising the steps of:

casting an iron cylinder block with a cylinder wall formed with at least one protuberance in a first area that will be subjected to a peak piston side thrust force during a descending stroke of the piston and without a protuberance in a second area that is not subjected to a peak piston side thrust force during a descending stroke of the piston so that the cylinder wall possesses in said first area a structure of graphite phase which is at least one of A and C types in accordance with ASTM standard, said A type having substantially uniformly distributed graphite flakes of medium size and said C type having in mixture substantially uniformly distributed graphite flakes of large and small sizes, having more advanced growth of graphite in said first area than in said second area, and removing the protuberance to form a cylinder bore so that said first and second areas are provided with different graphite phases in the cast iron cylinder bore.

2. Method in accordance with claim 1 in which a second protuberancy is formed in a third area at diametrically opposite side to the first mentioned area.

3. Method in accordance with claim 1 in which the protuberance is of an annular configuration formed circumferentially along the cylinder wall.

4. Method in accordance with claim 1 in which a second protuberance is formed at an axially spaced position from the first mentioned protuberance and said second protuberance is also removed to form a cylinder bore.

* * * * *